United States Patent
Khair et al.

(10) Patent No.: US 8,316,633 B2
(45) Date of Patent: Nov. 27, 2012

(54) PASSIVE NOX AND PM AFTERTREATMENT FOR DIESEL ENGINE

(75) Inventors: Magdi K. Khair, San Antonio, TX (US); Stefan Simescu, Boerne, TX (US); Gary D. Neely, Boerne, TX (US); Vlad L. C. Ulmet, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 354 days.

(21) Appl. No.: 12/475,099

(22) Filed: May 29, 2009

(65) Prior Publication Data

US 2010/0300073 A1 Dec. 2, 2010

(51) Int. Cl.
*F01N 3/00* (2006.01)

(52) U.S. Cl. ........... 60/285; 60/297; 60/299; 60/311

(58) Field of Classification Search ........ 60/278, 60/285, 293, 299, 301, 304, 311
See application file for complete search history.

(56) References Cited

U.S. PATENT DOCUMENTS

| | | | |
|---|---|---|---|
| 6,205,777 B1 * | 3/2001 | Pfefferle | 60/308 |
| 6,352,068 B1 * | 3/2002 | Jacobsen | 123/585 |
| 6,679,224 B2 | 1/2004 | Stanglmaier | 123/431 |
| 7,162,861 B2 | 1/2007 | Khair | 60/280 |
| 2003/0084876 A1 * | 5/2003 | Stanglmaier | 123/431 |
| 2003/0131593 A1 * | 7/2003 | Asanuma | 60/297 |
| 2003/0145581 A1 * | 8/2003 | Tashiro et al. | 60/286 |
| 2004/0083715 A1 * | 5/2004 | Le Leux et al. | 60/280 |
| 2004/0204818 A1 * | 10/2004 | Trudell et al. | 701/114 |
| 2005/0069476 A1 * | 3/2005 | Blakeman et al. | 423/239.1 |
| 2005/0193723 A1 * | 9/2005 | Khair | 60/289 |
| 2006/0016176 A1 * | 1/2006 | Hilden et al. | 60/286 |
| 2006/0107926 A1 * | 5/2006 | Endou et al. | 123/435 |
| 2006/0188416 A1 * | 8/2006 | Alward et al. | 422/180 |
| 2008/0053070 A1 * | 3/2008 | Hatton | 60/286 |
| 2008/0148720 A1 * | 6/2008 | Tahara | 60/295 |

* cited by examiner

*Primary Examiner* — Binh Q Tran
*Assistant Examiner* — Patrick Maines
(74) *Attorney, Agent, or Firm* — Chowdhury & Georgakis, PC; Ann C. Livingston

(57) ABSTRACT

A method of reducing emissions by operating a diesel engine in a stoichiometric air-fuel ratio mode. To achieve an optimal stoichiometric mode, intake throttling, boost air intake control, fuel injection adjustments, and exhaust gas recirculation (EGR) are used. This mode of operation permits an aftertreatment system that has only an oxidation catalyst and a particulate filter.

10 Claims, 3 Drawing Sheets

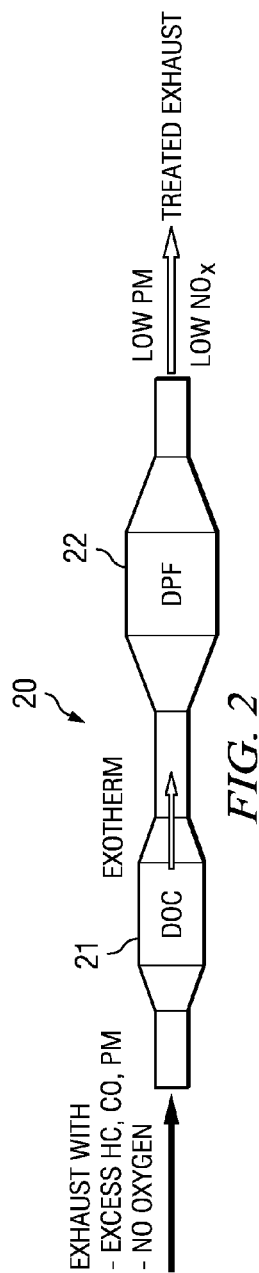
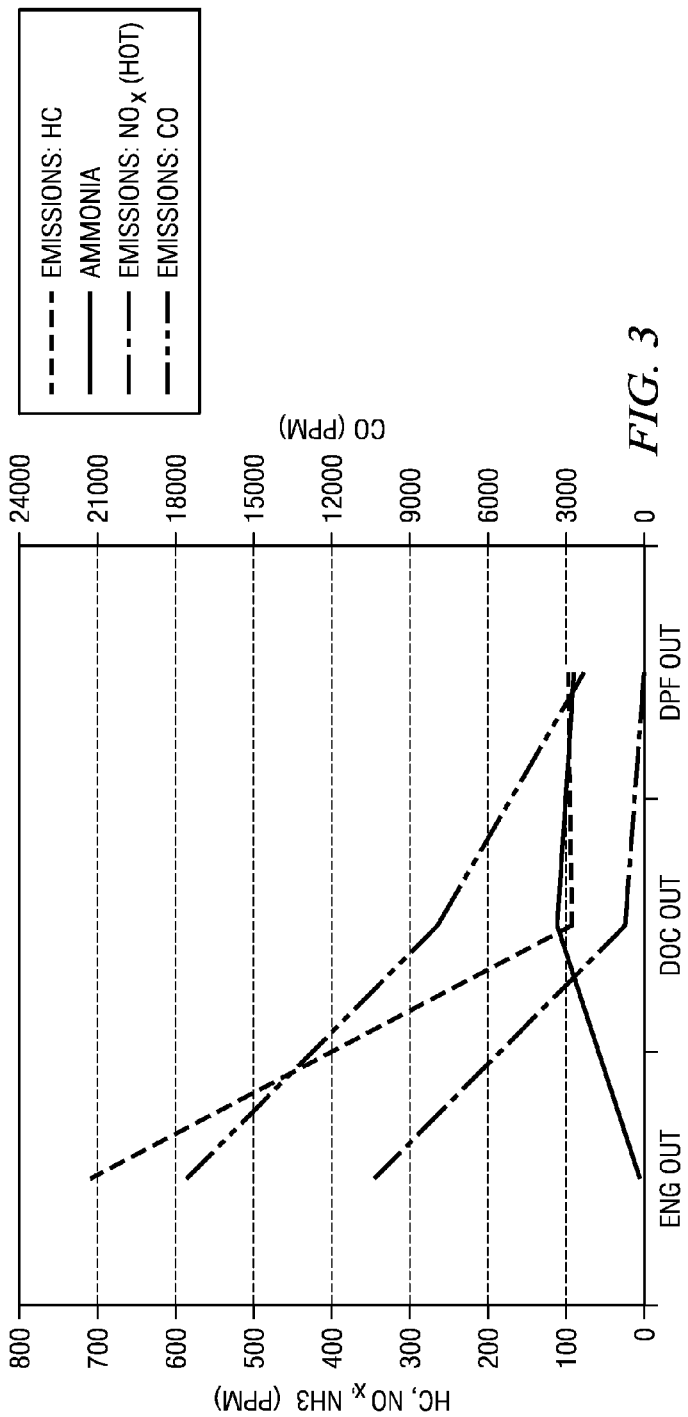

PASSIVE NOX AND PM AFTERTREATMENT FOR DIESEL ENGINE

TECHNICAL FIELD OF THE INVENTION

This invention relates to reducing exhaust emissions from diesel-fueled internal combustion engines, and more particularly to reducing NOx and PM from diesel exhaust without using supplemental reduction agents.

BACKGROUND OF THE INVENTION

Internal combustion engines used for both mobile and stationary applications are subject to strict emission limits. Approaches to reducing emissions include improved in-cylinder combustion designs or fuel modifications, but these improvements have fallen short of meeting emissions limits. Other approaches involve the use of exhaust aftertreatment devices, which have achieved significant emissions reductions.

For lean burn internal combustion engines, such as diesel engines, the main pollutants of concern are oxides of nitrogen (NOx) and particulate matter (PM). The latter is composed of black smoke (soot), sulfates generated by sulfur in fuel, and components of unburned fuel and oil.

To reduce NOx, one approach is the use of NOx reduction devices, such as lean NOx traps (LNTs), lean NOx catalysts (LNCs), and selective catalytic reduction (SCR) catalysts. These devices typically use reductants, such as carbon monoxide and hydrogen for LNTs, extra diesel fuel for LNCs, and ammonia for SCR catalysts.

To reduce PM, one approach is the use of various types of diesel particulate filters (DPFs). Like NOx reduction devices, PM reduction devices often use a reductant, such as supplemental hydrocarbon fuel to produce an exotherm for regenerating the DPF.

NOx reduction devices and DPFs may be used alone or together, with either or both being used downstream of the engine, in the exhaust line.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates the exhaust aftertreatment system of FIG. 1.

FIG. 3 illustrates the composition of the exhaust at various stages during the aftertreatment process.

DETAILED DESCRIPTION OF THE INVENTION

The following description is directed to reducing emissions by operating a diesel engine in a stoichiometric air-fuel ratio mode. In this mode, oxygen is depleted from the exhaust. To achieve an optimal stoichiometric mode, exhaust gas recirculation (EGR), intake throttling, fuel injection pressure and timing adjustments, and boost air intake control may be used.

Using EGR reduces engine-out NOx emissions, but has the undesirable side effect of increasing smoke and carbonaceous particulate matter (PM). This PM increase calls for the use of a catalyzed DPF. In addition, operating a diesel engine in stoichiometric mode increases its CO and HC emissions, thus leading to the use of an oxidation catalyst. Unlike methods of temporarily operating diesel engines stoichiometrically for purposes such as LNT regeneration, the method described herein is directed to a diesel engine whose "normal" operation mode is stoichiometric.

Figure 1:
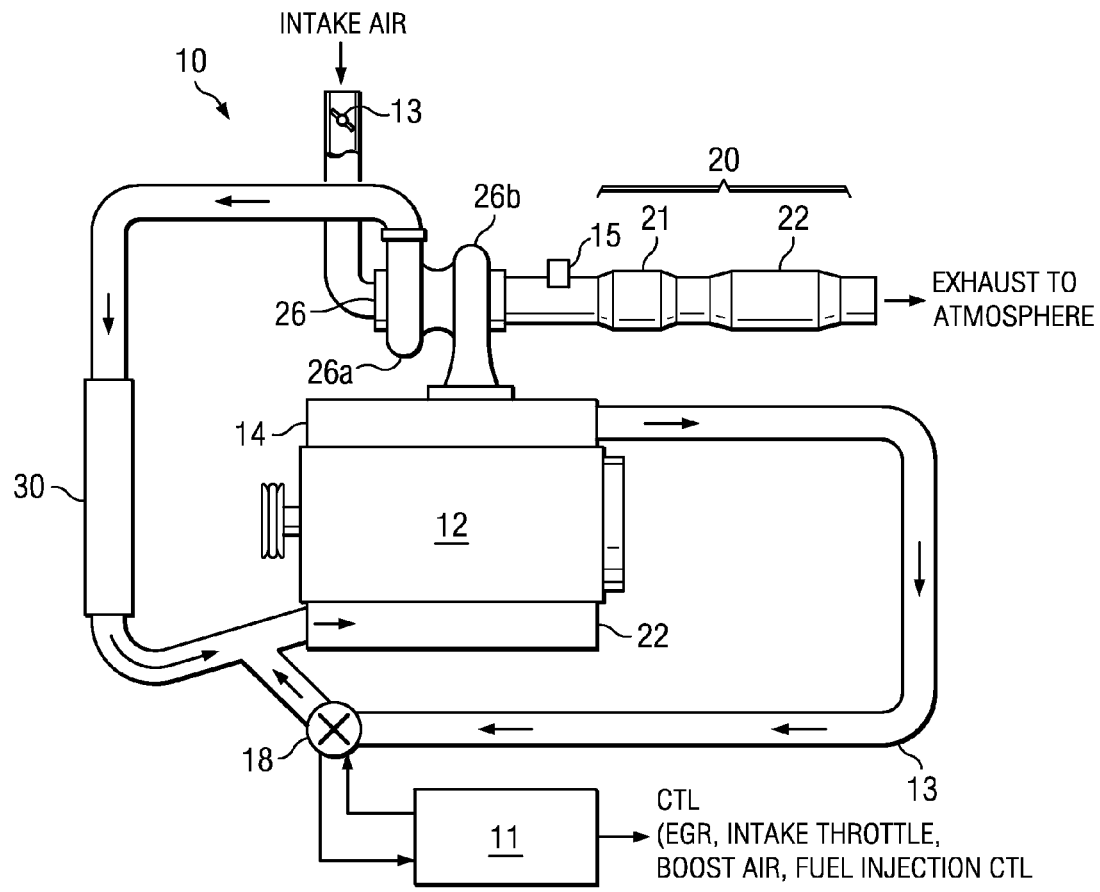
FIG. 1 illustrates a diesel-fueled engine system having an exhaust aftertreatment system in accordance with the invention.

FIG. 1 illustrates a diesel engine system, generally identified as 10, having an exhaust aftertreatment system in accordance with the invention. In the illustrative embodiment, system 10 has a diesel engine 12, an exhaust gas recirculation (EGR) loop 13, and is an air-boosted system having a turbocharger 26. It is also assumed that engine 12 is a fuel-injected engine, having fuel injectors (not shown), whose fuel injection pressure may be controlled by appropriate control signals.

The direction of flow of exhaust gas through the EGR loop is indicated by directional arrows in FIG. 1. Exhaust gas discharged from the engine's exhaust manifold 14 is directed through the EGR loop, which may include a filter and/or heat exchanger (not shown). The recirculated exhaust gas flows to an EGR valve 18, and then to the engine's intake manifold 22 where it is mixed with fresh intake air.

The engine's intake air is compressed by the turbocharger's compressor 26a, which is mechanically driven by its turbine 26b. Desirably, the compressed air discharged from the compressor 26a is cooled through an intercooler 30 positioned between the compressor 26a and the intake manifold 22.

The exhaust aftertreatment system 20 has both a diesel oxidation catalyst (DOC) 21 and diesel particulate filter (DPF) 22, both located downstream of the turbocharger. They are typically installed in-line on an under-floor exhaust line. As explained below, the engine's exhaust is treated by these devices, which reduce HC, CO, and PM emissions in the exhaust. The treated exhaust exits the DPF 22 into the atmosphere via the tailpipe.

Control unit 11 may be processor-based, programmed to control various aspects of engine operation. In general, control unit 11 may be implemented with various controller devices known or to be developed. Further, control unit 11 may be part of a more comprehensive engine control unit that controls various other engine and/or emissions devices.

FIG. 2 illustrates the aftertreatment system 20 in further detail. As stated above, engine 10 is operated in stoichiometric mode, accomplished by using a combination of EGR percentage control, intake air throttling, fuel injection pressure adjustment, and intake air boost control. As a result, the exhaust has reduced NOx, but elevated HC, CO, and PM emissions.

With these characteristics, when the exhaust flows through DOC 21, the excess HC and CO produce an exotherm. The exotherm assists the DPF 22 by thermally burning carbonaceous PM. In this manner, the excess HC and CO are converted in the DOC 21. When the exhaust emerges from DOC 21, it contains zero or near zero oxygen.

DPF 22 is a catalyzed DPF, which permits it to passively regenerate. The regeneration results from chemical reaction of the DPF catalyst, which raises the temperature within the filter high enough to oxidize soot collected in the DPF 22. An example of a suitable catalyst is a platinum coating on the walls of the DPF 22.

FIG. 3 illustrates the emissions resulting from a diesel engine operating in stoichiometric mode and using the aftertreatment system of FIG. 2. As illustrated, a marked reduction in HC and CO emissions at DOC 21 indicates the exotherm used for DPF regeneration. DPF 22 primarily uses this exotherm for regeneration, with its passive regeneration capability used to reduce the exothermic energy required for regeneration.

The engine also produces exhaust with reduced NOx. The following equation describes the reaction leading to this reduction, based on the fact that most diesel NOx is primarily NO:

$$NO + CO \Leftrightarrow \frac{1}{2} N_2 + CO_2 \qquad (1)$$

Ammonia ($NH_3$) is formed when the exhaust flows through the DOC 21. A possible reaction is as follows:

$$2NO + CO + 3H_2O \Leftrightarrow 2NH_3 + CO_2 + 2O_2 \qquad (2)$$

The ammonia formed over the DOC 21 reacts with $NO_x$ according to the following:

$$NO + NO_2 + 2NH_3 \Leftrightarrow 2N_2 + 3H_2O \qquad (3)$$

or $$6NO_2 + 8NH_3 \Leftrightarrow 7N_2 + 12H_2O \qquad (4)$$

Therefore, with DOC 21 placed upstream of DPF 22 in the exhaust of stoichiometric air-fuel diesel combustion, a 4-way emission reduction is observed as follows:
1) HC is reduced through the DOC
2) CO is reduced through the DOC
3) PM is reduced through the DPF
4) NOx is reduced through reaction In addition, low oxygen suppresses the conversion of NO to $NO_2$ in the DOC 21.

Figure 4:
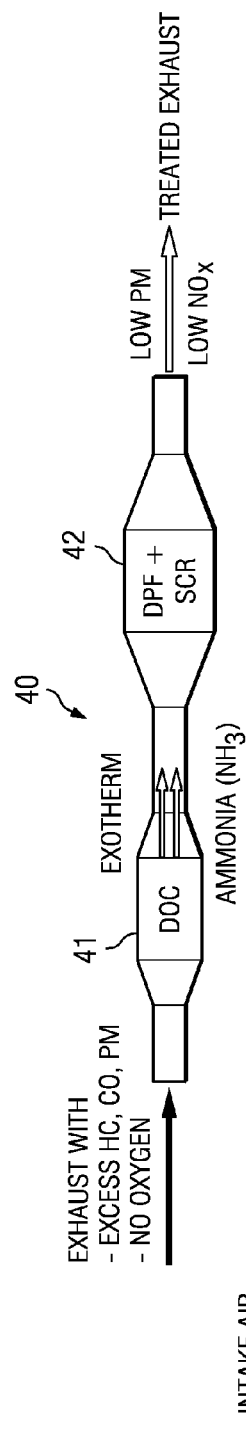
FIG. 4 illustrates a modification of the exhaust aftertreatment system.

FIG. 4 illustrates an aftertreatment system 40, in which performance is enhanced by adding a selective catalytic reduction (SCR) coating on the filter walls of the catalyzed DPF. The system 40 has a DOC 41 similar to DOC 21. With regard to the DPF/SCR 42, the additional SCR coating selectively retains nitric oxides, thus providing additional NOx reduction through the reactions described above.

Figure 4A:
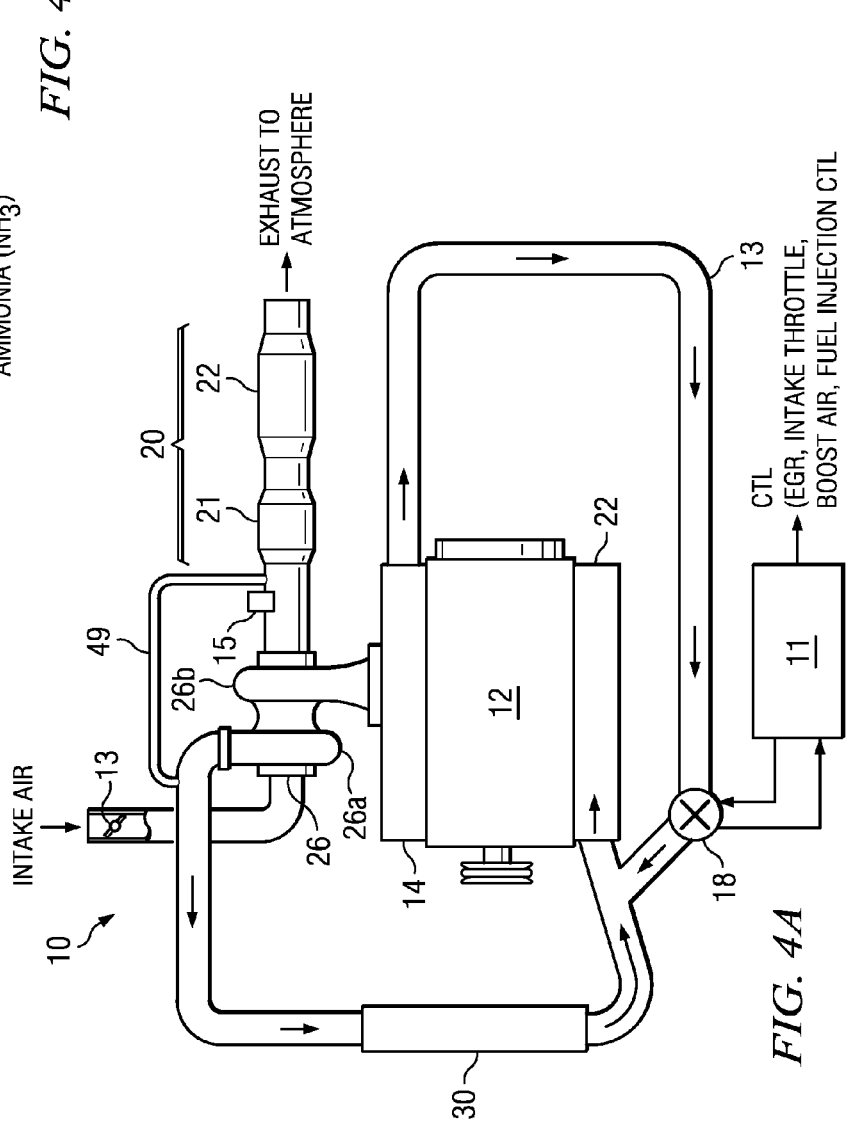
FIG. 4A illustrates a modification used to supply oxygen to the point of reduction.

As illustrated in FIG. 4A, for reduction of NOx via ammonia, it may be desirable to provide oxygen at the point of reduction via a line 49. A method of providing a small flow of air, via a line diverted from the output of an air-charging device such as a turbocharger, to an entry point upstream of an emission control device is described in U.S. Pat. No. 7,162,861, entitled "Method of Improving Performance of Emission Control Devices by Controlling Exhaust Oxygen Content", to M. K. Khair.

Figure 5:
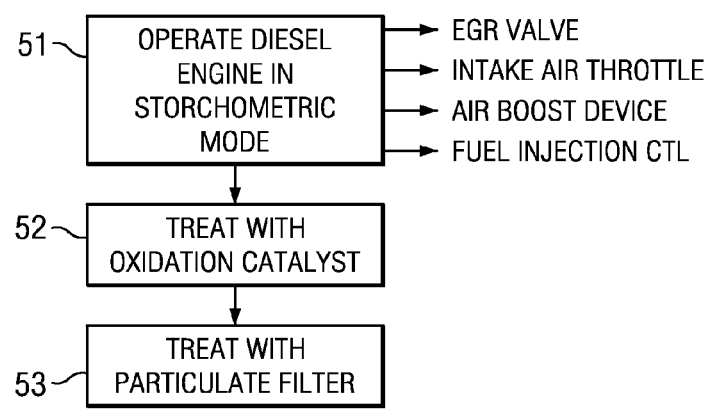
FIG. 5 illustrates a method of reducing emissions from a diesel engine in accordance with the invention.

FIG. 5 illustrates a method of reducing emissions from a diesel engine in accordance with the invention. As indicated above, control unit 11 is programmed to receive input signal, perform processing, and deliver output signals to perform this method.

Referring to both FIGS. 1 and 5, Step 51 is operating the diesel engine 12 in a stoichiometric mode. As stated above, this is accomplished by using control unit 11 to provide input signals to EGR valve 18, intake air throttle 13, turbocharger 26, and fuel injectors (not shown). An oxygen sensor 15 may be placed in the exhaust line to ensure that the oxygen content sufficiently depleted, and used for feedback to control unit 11.

The stoichiometric mode is optimized to improve fuel economy and performance. In general, of the various alternatives described herein for achieving less oxygen in the air-fuel ratio, the use of increased EGR is the least preferred due to the resulting increase in PM. The primary control used for stoichiometric operation is intake throttling to reduce air flow, thus reducing the oxygen into the engine cylinders. The turbocharger boost is reduced to push less air into the engine. This tends to reduce engine efficiency by lowering the ability of the air-fuel mix to completely burn the HC in the fuel.

To compensate for the drop in efficiency, increased fuel injection pressure is used to improve or recover combustion efficiency and fuel economy. Higher injection pressure reduces fuel droplet size, thus facilitating quick evaporation and mixing with air in the combustion chamber. With this enhanced mixing, the injected fuel is better able to completely burn in the cylinder. Efficiency can be improved by also advancing injection timing in addition to increasing fuel injection pressure. This permits more time for mixing of fuel and air, as well as places the fuel at an optimized time during the combustion cycle. In this manner, both increased injection pressure and advanced injection timing may be used to recover any fuel economy lost due to operation of engine 11 in stoichiometric mode.

In sum, intake throttling and decreased boost are used to achieve stoichiometric mode, and are used in conjunction with fuel injection control to achieve an "optimal" stoichiometric mode, in terms of engine performance and fuel efficiency. If a combination of intake throttling, turbocharger boost, and fuel injection control falls short of achieving optimal stoichiometric operation, EGR may be used to further reduce oxygen content.

In stoichiometric mode, relative to operating in lean burn mode, the engine produces excessive concentrations of HC, CO, and PM in a low or no O2 environment. The aftertreatment system comprises a specially formulated DOC 21 and DPF 22. The aftertreatment system need not have a NOx reduction device and does not require an external reductant to be introduced into the exhaust flow.

In Step 52, DOC 21 performs a 4-way emission reduction. Both HC and CO produce an exotherm, which helps to regenerate the catalyzed DPF 22 placed downstream from the DOC.

In Step 53, PM is reduced through the catalyzed DPF 22. NOx is reduced through the excessive CO present in the exhaust and is chemically removed through reactions described in the details of the novel approach description. An SCR coating may be added to the catalyzed DPF to further reduce NOx through its reaction with ammonia produced by the DOC.

Although the "normal" engine operating mode is stoichiometric, modifications to the control system may be made to accommodate certain operating conditions, such as acceleration. In this case, the engine could be operated with a lean air-fuel ratio, with an increase in EGR to accomplish engine-out NOx compliance.

What is claimed is:
1. A method for reducing the particulate matter and NOx content of the exhaust gas of a diesel engine, without use of a lean NOx trap, comprising:
    operating the diesel engine such that its normal operation is stoichiometric and does not include any active regeneration mode;

wherein the engine-out exhaust normally contains more hydrocarbon and carbon monoxide emissions than NOx emissions;

wherein the stoichiometric engine operation is achieved by using one or more of the following: intake air throttling and decreased intake air boosting;

directing the exhaust gas from the engine to a diesel oxidation catalyst;

wherein the diesel oxidation catalyst is formulated to provide an exothermic reaction from hydrocarbon and carbon monoxide in the exhaust gas and to use reduce the NOx content of the exhaust gas to a constant DOC-out level of less than 50 ppm; and directing the exhaust gas from the diesel oxidation catalyst to a catalyzed diesel particulate filter;

wherein the diesel particulate filter is proximate the diesel oxidation catalyst such that the exothermic reaction raises the exhaust temperature at the input to the diesel particulate filter by an amount sufficient to passively regenerate the diesel particulate filter.

2. The method of claim 1, wherein the stoichiometric mode is further achieved by using fuel injection pressure control.

3. The method of claim 1, wherein the stoichiometric mode is further achieved by using exhaust gas recirculation control.

4. The method of claim 1, wherein the diesel particulate filter is catalyzed with a platinum coating on its filter walls.

5. The method of claim 1, wherein the diesel particulate filter further has a selective catalytic reduction (SCR) coating on its filter walls.

6. The method of claim 1, further comprising the step of adding oxygen to the exhaust immediately upstream the particulate filter via a line diverted from the turbocharger.

7. The method of claim 1, further comprising the step of using an oxygen sensor between the exhaust manifold and the oxidation catalyst to determine the amount of oxygen in the exhaust, and wherein the amount of oxygen is used as feedback for the step of operating the diesel engine in stoichiometric mode.

8. The method of claim 1, further comprising the step of regenerating the particulate filter using exotherm energy generated in the oxidation catalyst.

9. The method of claim 1, further comprising the step of controlling fuel injection timing to achieve stoichiometric mode.

10. The method of claim 1, wherein the step of operating the diesel engine is performed by using an engine control strategy that reduces in-cylinder oxygen by preferentially using one or more of the following actions in the following preference as needed to achieve the engine-out NOx level: intake air throttling, turbocharger boost reduction, increased fuel injection pressure, addition of recirculated exhaust.

* * * * *